(12) United States Patent
Cha

(10) Patent No.: US 6,187,988 B1  
(45) Date of Patent: *Feb. 13, 2001

(54) PROCESS FOR MICROWAVE DECOMPOSITION OF HAZARDOUS MATTER

(76) Inventor: Chang Yul Cha, 3807 Reynolds St., Laramie, WY (US) 82072

(*) Notice: Under 35 U.S.C. 154(b), the term of this patent shall be extended for 0 days.

This patent is subject to a terminal disclaimer.

(21) Appl. No.: 09/259,403

(22) Filed: Feb. 26, 1999

(51) Int. Cl.$^7$ .............. A62D 3/00; B01D 53/00; B01D 17/06; C07F 1/00

(52) U.S. Cl. .......... 588/227; 204/157.3; 204/157.43; 204/157.6; 204/157.81; 204/158.2; 204/158.21; 210/748

(58) Field of Search .......... 204/157.43, 158.2, 204/157.3, 157.6, 157.8, 158.21; 588/227; 210/748

(56) References Cited

U.S. PATENT DOCUMENTS 4,935,114 * 6/1990 Varma .............. 204/157.43
5,269,892 12/1993 Cha .............. 204/157.3
5,451,302 9/1995 Cha .............. 204/157.15

OTHER PUBLICATIONS

Kirk–Othmer, *Encyclopedia of Chemical Technology*, 3rd Ed., vol. 15, "Microwave Technology," pp 494–522, John Wiley, NY, 1981. no month available.

Kirk–Othmer, *Encyclopedia of Chemical Technology*, 3rd Ed., Supp. vol., "Plasma Technology," pp 599–608, John Wiley, NY, 1981. no month available.

* cited by examiner

Primary Examiner—Edna Wong
(74) Attorney, Agent, or Firm—John O. Mingle

(57) ABSTRACT

This process occurs in the presence of activated carbon or its equivalent by decomposing adsorbed hazardous materials, such as hydrazine and microorganisms, on the carbon surface by radiofrequency energy in the microwave range at near ambient conditions of temperature and pressure. Further microwave oxidation to nonhazardous gases occurs in the presence of a microwaves enhanced oxidation catalyst.

18 Claims, 1 Drawing Sheet

PROCESS FOR MICROWAVE DECOMPOSITION OF HAZARDOUS MATTER

BACKGROUND OF INVENTION

1. Field of Invention

The present invention relates to a process using radiofrequency microwave energy to decompose hazardous matter and if necessary further oxidize them to environmentally safe residues.

2. Background

Wet air oxidation (WAO), a common subcategory of wet oxidation, is the oxidation of chemical substances that often represent hazardous materials whereby the oxidation products are of a nonhazardous nature. Generally such chemicals are organic substances, matter or materials, often referred to just as organics, and often represent a constituent of contaminated water. WAO is a common method of treating hazardous organic materials when they are in solution form; however, WAO also requires elevated temperatures and pressures. Characteristic temperatures employed are from 150–325° C. while pressures are typically in the range of 2000–20,000 kPa. In most WAO processes agitation is employed to transfer oxygen from the gas phase to the liquid phase where the oxidation reaction occurs at these elevated conditions. U.S. patent application Ser. No. 09/064,266, filed Apr. 22, 1998 now U.S. Pat. No. 6,045,663 by Chang Yul Cha, entitled "Process for Microwave Enhancement of Wet Oxidation" describes microwave improvements in WAO, and its specification is hereby incorporated by reference.

In the subject case the oxidation of hazardous waste matter is chemically exemplified by hydrazine and its derivatives, monomethyl hydrazine (MMH) and unsymmetrical dimethyl hydrazine (UDMH), and is a primary consideration since they are examples of typical hazardous matter that are either water-borne or gas-borne. Unless otherwise indicated when the word "hydrazine" is employed it also includes its associated derivatives "MMH" and "UDMH".

Hydrazine is a common spacecraft propellant for use in missiles, rockets, and space launch vehicles. When used as such an astronautics fuel, nitrogen tetroxide is the most common oxidizer. However around space launch areas, much waste, both water and gases, containing dilute hydrazine occurs and must be environmentally processed. The subject invention performs microwave enhanced decomposition with further oxidation to environmentally acceptable gases and is a favorable process to perform this clean up task.

Another class of hazardous matter is microorganisms, which in general are water-borne although in the case of terrorists or accident situations, they are also potentially air-borne. The common water treatment for microorganisms is the use of chlorination although other treatments such as chloramination, chorine dioxide, ozonation, and UV radiation are employed. For example, see Byrant, et al., *Disinfection Alternatives For Safe Drinking Water*, Van Norstrand Reinhold, N.Y., 1992.

In the subject invention, microorganisms are characterized by the psetidomonas bacteria since this is conveniently available for laboratory experiments.

Quantum radiofrequency (RF) physics is based upon the phenomenon of resonant interaction with matter of electromagnetic radiation in the microwave and RF regions since every atom or molecule can absorb, and thus radiate, electromagnetic waves of various wavelengths. The rotational and vibrational frequencies of the electrons represent the most important frequency range. The electromagnetic frequency spectrum is usually divided into ultrasonic, microwave, and optical regions. The microwave region is from 300 megahertz (MHz) to 300 gigahertz (GHz) and encompasses frequencies used for much communication equipment. For instance, refer to Cook, *Microwave Principles and Systems*, Prentice-Hall, 1986.

Often the term microwaves or microwave energy is applied to a broad range of radiofrequency energies particularly with respect to the common heating frequencies, 915 MHz and 2450 MHz. The former is often employed in industrial heating applications while the latter is the frequency of the common household microwave oven and therefore represents a good frequency to excite water molecules. In this writing the term "microwaves" is generally employed to represent "radiofrequency energies selected from the range of about 500 to 5000 MHz", since in a practical sense this total range is employable for the subject invention.

The absorption of microwaves by the energy bands, particularly the vibrational energy levels, of atoms or molecules results in the thermal activation of the nonplasma material and the excitation of valence electrons. The nonplasma nature of these interactions is important for a separate and distinct form of heating employs plasma formed by arc conditions at a high temperature, often more than 3000° F., and at much reduced pressures or vacuum conditions. For instances refer to Kirk-Othmer, *Encyclopedia of Chemical Technology*, 3rd Edition, Supplementary Volume, pages 599–608, Plasma Technology. In microwave technology, as applied in the subject invention, neither condition is present and therefore no plasmas are formed.

Microwaves lower the effective activation energy required for desirable chemical reactions since they can act locally on a microscopic scale by exciting electrons of a group of specific atoms in contrast to normal global heating which raises the bulk temperature. Further this microscopic interaction is favored by polar molecules whose electrons become easily locally excited leading to high chemical activity; however, nonpolar molecules adjacent to such polar molecules are also affected but at a reduced extent. An example is the heating of polar water molecules in a common household microwave oven where the container is of nonpolar material, that is, microwave-passing, and stays relatively cool.

In this sense microwaves are often referred to as a form of catalysis when applied to chemical reaction rates. For instance, refer to Kirk-Othmer, *Encyclopedia of Chemical Technology*, 3rd Edition, Volume 15, pages 494–517, Microwave Technology.

| U.S. Pat. No. | Inventor | Year |
| --- | --- | --- |
| 5,269,892 | Cha | 1993 |
| 5,451,302 | Cha | 1995 |

Referring to the above list, Cha in '892 discloses char-gas oxide reactions, such as $NO_x$ decomposition, catalyzed by microwaves, but does not decompose general hazardous matter.

Cha in '302 discloses microwave catalysis of chemical reactions using waveguide liquid films but with no carbonaceous material. The concentration of phosphoric acid by removal of bound water and the release of carbon dioxide from pregnant solutions of monoethanolamine are shown. However the subject invention does not utilize such a waveguide liquid film which requires a microwave-passing substrate.

SUMMARY OF INVENTION

The objectives of the present invention include overcoming the above-mentioned deficiencies in the prior art and providing a potentially economically viable process for the microwave decomposition of hazardous matter. This process occurs in the presence of activated carbon or its equivalent by decomposing adsorbed hazardous matter on the carbon surface by radiofrequency energy in the microwave range at near ambient conditions of temperature and pressure. If necessary, further oxidation to nonhazardous gases occurs in the presence of a microwave enhanced oxidation catalyst.

DETAILED DESCRIPTION OF INVENTION

Microwaves are a versatile form of energy that is applicable to enhance chemical reactions since the energy is locally applied by its largely vibrational absorption by nonpolar molecules and does not produce plasma conditions. Particularly reactions that proceed by free-radical mechanisms are often enhanced to higher rates because their initial equilibrium thermodynamics is unfavorable. A second class of enhanced reactions are those whose reaction kinetics appear unfavorable at desirable bulk temperature conditions.

Carbonaceous material is an excellent microwaves absorber since it has a wide range of polar impurities that readily interact with such radiofrequency energy especially in vibrational modes. Consequently the microwave waveguide design for the microwave cavity is not usually critical. Carbonaceous material for use with the subject invention commonly comprises activated carbon, char, soot, pyrolytic carbon, carbon black, activated charcoal, and metal carbides. In many instances activated carbon is the preferred material to employ, especially in a water medium, under ambient temperature and pressure conditions, although activated charcoal, if readily available, might be more cost effective. However in gaseous systems other carbonaceous materials such as metal carbides, especially silicon carbide, are convenient to utilize. Silicon carbide is especially utilized as a microwave absorbing substrate to enhance conventional catalytic processes.

The microwave excitation of the molecules of the carbonaceous material excites constituents, such as hazardous matter or contaminants, which have been adsorbed on the internal pore surfaces of the carbonaceous material and produces a highly reactive condition. Further molecules from the carrier medium are in close proximity or within the surface boundary layer of the carbon surface through chemisorption, absorption, adsorption, or diffusion, and additional chemical reactions with these constituents may occur.

The oxygen required for the oxidation step does not need to be only in the gaseous form of $O_2$, but can also be with a selected oxygen containing molecule, such as $H_2O_2$ and $O_3$. The use of hydrogen peroxide or ozone will accelerate the subject invention's oxidation step.

The principal decomposition reactions using hydrazine and its derivatives are:

$$N_2H_4 \text{—(RF)} \rightarrow 2H_2 + N_2 \quad (1)$$

$$CH_3N_2H \text{—(RF)} \rightarrow CH_4 + N_2 \quad (2)$$

$$(CH_3)_2N_2H_2 \text{—(RF)} \rightarrow 2CH_4 + N_2 \quad (3)$$

Eq. (1) is for hydrazine, Eq. (2) for monomethyl hydrazine (MMH), Eq. (3) for unsymmetrical dimethyl hydrazine (UDMH), and the "RF" implies that the reaction occurs in the presence of microwaves. Thus the required further reactions consist of the oxidation of hydrogen and methane into water and carbon dioxide to produce environmentally acceptable discharge gases.

Figure 1:
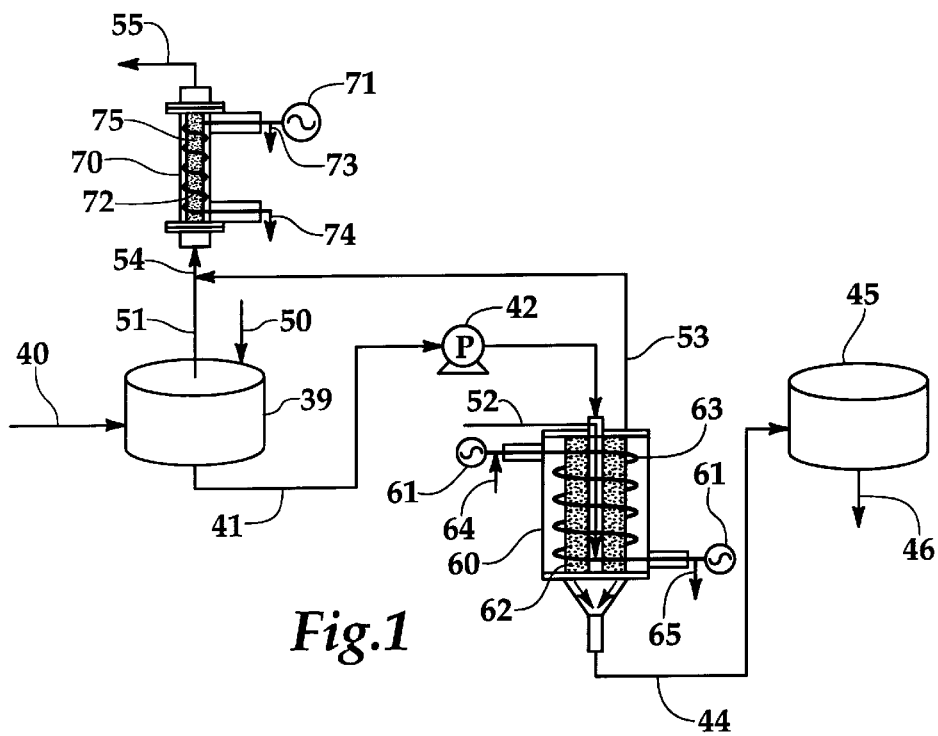
FIG. 1 shows a flow process for the decomposition and further oxidation of water-borne hydrazine.

FIG. 1 shows a typical process for treating water-borne hazardous matter, a characteristic example which is hydrazine. Water 40 containing hazardous contaminants, such as hydrazine or microorganisms, comes from a conventional scrubber system and is stored in tank 39 where a sweep gas 50, such as air or oxygen, produces an off-gas 51. The contaminated water 41 is pumped 42 into the top of a carbon core microwave reactor 60 where a purge gas 52 also enters. The reactor 60 consists of a hollow cylinder of carbonaceous material 62, such as activated carbon, surrounded by a helical coil carrying microwaves 63 which are energized by microwave waveguide connectors 61. Because of the heating nature of microwave cavities, cooling water enters 64 and leaves 65 at the these waveguide connectors. The contaminated fluid 41 enters through the center and flows out radially through the activated carbon 62 where the hydrazine is adsorbed and decomposed by microwaves. The substantially hydrazine-free water leaves 44 and is stored in tank 45 where it is then recycled 46 to the scrubber system. The purge gas 53 containing the decomposition products of hydrazine leaves the reactor 60 where it joins 54 the off-gas 51 from the contaminated water storage tank 39 and enters a microwave oxidation catalyst reactor 70 fed by a microwaves 71 with waveguide cooling water entering 73 and leaving 74. The purge gas, which contains oxygen, passes through an oxidation catalyst bed 75, composed of platinum or palladium and comprising a microwave absorbing substrate such as impregnation with silicon carbide, surrounded by a helical waveguide 72 where the decomposition products are oxidized to environmentally safe gases and vented 55. The microwave oxidation catalyst reactor 70 is sized by the amount of oxidation catalyst 75 required to clean the entering purge gas 54 and is often quite small since the concentration of hydrazine in the entering water 40 is at most a few percent; therefore, the oxygen required is easily supplied by the sweep gas 50.

Figure 2:
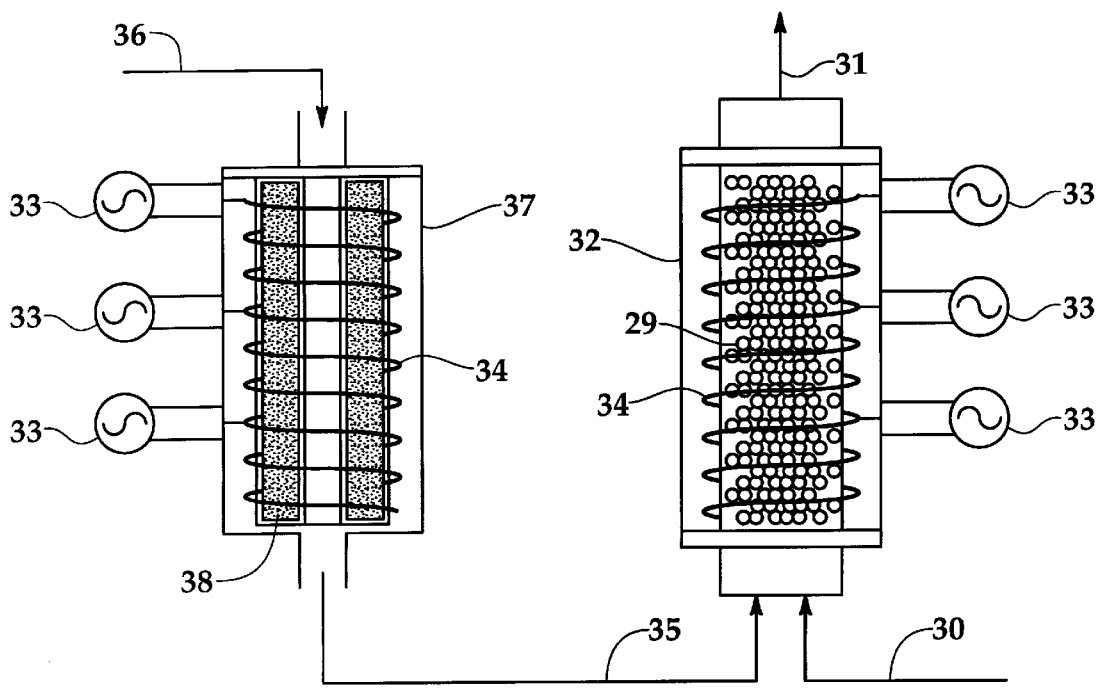
FIG. 2 shows a flow process for the decomposition and further oxidation of gas-borne hydrazine.

Whereas FIG. 1 is designed for a water-borne hazardous contamination, the multipurpose microwave reactor in FIG. 2 utilizes gas-borne hazardous matter and where the two stages as shown are within the same microwave cavity 33. The first stage is a fixed bed reactor 37 composed of carbonaceous material, such as activated carbon 38, and the second stage is a fluidized bed reactor 32 composed of pellets of conventional oxidization catalyst 29, such as platinum or palladium on an appropriate microwave absorbing substrate, such as impregnation with silicon carbide. As noted a gas stream 30 containing some form of oxygen optionally may be introduced before the second stage 32. In both stages a helical waveguide 34 is employed. In this multipurpose microwave reactor of FIG. 2 the design utilizes an input carrier gas 36 with gas-borne hazardous mater, such as hydrazine. The first stage 37 passes the carrier gas 36 containing contaminants though a carbon core reactor 38 where the microwave decomposition of the hydrazine occurs. The leaving carrier gas 35 contains decomposition products which then enter stage two 32 where oxidation to environmentally clean discharge 31 occurs. Whereas FIG. 2 shows the two stages side-by-side, other physical arrangements are entirely possible. The second stage 32, although shown as a fluidized bed can, depending upon the detailed reactor design, be several types of beds including fluidized beds, fixed beds, semi-fluidized beds, suspended beds, and moving beds.

EXAMPLE 1

An experimental setup similar to that shown as the first stage of FIG. 2 was employed to determine the efficiency of the oxidation of UDMH by microwave decomposition. The tests utilized approximately 1.3% UDMH in a helium carrier gas passing through an 0.5 inch diameter quartz bed packed with 12-inches of char within a microwave cavity. A gas chromatograph was employed to measure the off-gas concentration of methane and nitrogen. As shown in Table 1, the tests proved that the proposed system can substantially decompose or destroy UDMH and using a microwave input power of 700 W or more produced 100% destruction efficiency.

TABLE 1

Results of UDMU Vapor Destruction Experiments

| Microwave Input Power | $CH_4$ Concentration (Outlet Gas) | $N_2$ Concentration (Outlet Gas) | UDMH Destruction Efficiency |
|---|---|---|---|
| 300 W | 4.5% | 1.7% | 79% |
| 400 W | 4.8% | 1.8% | 89% |
| 500 W | 6.5% | 3.0% | 93% |
| 600 W | 6.9% | 3.0% | 97% |
| 700 W | 7.0% | 2.4% | 100% |
| 800 W | 7.0% | 1.4% | 100% |

EXAMPLE 2

Additional tests using the experimental setup of Example 1 were obtained to determine the effect of the gas hourly space velocity through this experimental reactor. Using 800 W microwave power it was determined that if the gas hourly space velocity is less than 2500/hr, complete decomposition of the UDMH occurred. Above this value some higher molecular weight intermediate decomposition products occurred; however, as long as these were gaseous or capable of easy volitization, the oxidation stage of the multipurpose microwave reactor can handle their further complete oxidation.

EXAMPLE 3

Additional tests using the experimental setup of Example 1 were obtained to determine the destruction efficiency in the vapor phase of only hydrazine. The inlet hydrazine vapor concentration was 1.95%, and only the nitrogen content of the largely helium off-gas was measured with the gas chromatograph since no methane was produced. The result was that even at the low microwave power of 100 W, the destruction efficiency was 99.97%, and any larger power level gave complete destruction.

EXAMPLE 4

The first stage of the setup of FIG. 1 was employed at pilot plant scale to show the water-borne decomposition of hydrazine and its derivatives. This first stage was an activated carbon hollow core 4.24-inch outside diameter, 1.25-inch inside diameter, and 19.5-inch long. The capacity of this bed was one liter of fluid per minute, and the inlet concentration of hydrazine was similar to that obtained from upstream commercial scrubber operation, about one percent. Since solid carbonaceous material preferentially absorbs microwave energy over water, the water medium essentially acts as an inert medium. Utilizing nitrogen purge gas with 800 W microwave power, 100% efficiency of destruction of hydrazine and its derivatives was obtained in this pilot plant test resulting in clean water returned to the scrubber system.

EXAMPLE 5

The setup of Example 4 was employed to test the ability of microwaves to disinfect microorganism contaminated water. The feed solution was $1.35 \times 10^6$ cells/ml of pseudomonas bacteria in distilled water, while the measurement procedure used Heterotropic Plate Count on R2 Ages by the Spread Plate Method incubated at 25° C. The microwave power was 800 Watt. With a flow rate of 500 ml/min, producing a residence time of 37 seconds, the destruction efficiency was 65%. With a flow rate of 200 ml/min, producing a residence time of 93 seconds, the destruction efficiency was 100%.

A process for water-borne hazardous matter decomposition comprising adsorbing said water-borne hazardous matter with a bed of carbonaceous material while exposing to microwaves. Treating said bed of carbonaceous material with a purge gas to remove decomposition products; then passing said purge gas through a microwave enhanced bed of oxidation catalysts while adding sufficient oxygen to substantially oxidize all said decomposition products, wherein said oxidation catalysts are deposited on a substrate impregnated with ceramic or metal carbide, such as silicon carbide. The purge gas is selected from the group consisting of nitrogen, helium, air, and carbon dioxide which are substantially inert in this water-borne case. The hazardous matter further comprises being selected from the group consisting of hydrazine and its derivatives, microorganisms, and hydrocarbon-based chemicals, and this includes many common chemicals found in residual operations which employ water scrubbing for removal. In particular microorganisms are likely a water-borne hazardous matter.

A process for gas-borne hazardous matter decomposition comprising adsorbing said gas-borne hazardous matter with a bed of carbonaceous material while exposing to microwaves, wherein said gas-borne hazardous matter resides within a carrier gas substantially free of oxygen. Passing the carrier gas, which now contains decomposition products from said gas-borne hazardous matter, through a microwave enhanced bed of oxidation catalysts while adding sufficient oxygen to substantially oxidize all said decomposition products, wherein said oxidation catalysts are deposited on a substrate impregnated with ceramic or metal carbide, such as silicon carbide. The carrier gas in this gas-borne case is selected from steam, nitrogen, helium, carbon dioxide, since these are substantially inert. The hazardous matter is hydrazine and its derivatives, hydrocarbon vapors, hydrocarbon-based chemicals, and microorganisms in this gas-borne case.

The microwaves are radiofrequency energy in the range of 500 to 5000 Mhz which represents a practical range obtained with prudent expense for a microwave generator. The carbonaceous material is selected from the group consisting of activated carbon, char, soot, pyrolytic carbon, carbon black, activated charcoal, and metal carbides; however, activated carbon is the most common adsorbent substance. All the beds are selected from fluidized beds, fixed beds, semi-fluidized beds, suspended beds, and moving beds. In routine applications fixed beds are preferred; however, in large applications moving beds often represent an advantage. Because of the substantially complete oxidation of the decomposition products, the discharged gas is environmentally clean.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A process for water-borne hazardous matter decomposition comprising:

adsorbing said water-borne hazardous matter with a bed of carbonaceous material while exposing to microwaves;

treating said bed of carbonaceous material with a purge gas to remove decomposition products; and passing said purge gas through a microwave enhanced bed of oxidation catalysts while adding sufficient oxygen to substantially oxidize all said decomposition products, wherein said oxidation catalysts are deposited on a substrate impregnated with metal carbide.

2. The process according to claim 1 wherein said purge gas further comprises being selected from the group consisting of nitrogen, helium, air, and carbon dioxide.

3. The process according to claim 1 wherein said hazardous matter further comprises being selected from the group consisting of hydrazine and its derivatives, microorganisms, and hydrocarbon-based chemicals.

4. The process according to claim 1 wherein said microwaves further comprise radiofrequency energy selected from the range consisting of 500 to 5000 Mhz.

5. The process according to claim 1 wherein said carbonaceous material further comprises being selected from the group consisting of activated carbon, char, soot, pyrolytic carbon, carbon black, activated charcoal, and metal carbides.

6. The process according to claim 1 wherein all beds further comprise being selected from the group consisting of fluidized beds, fixed beds, semi-fluidized beds, suspended beds, and moving beds.

7. A process for gas-borne hazardous matter decomposition comprising:

adsorbing said gas-borne hazardous matter with a bed of carbonaceous material while exposing to microwaves, wherein said gas-borne hazardous matter resides within a carrier gas substantially free of oxygen; and passing said carrier gas, which contains decomposition products from said gas-borne hazardous matter, through a microwave enhanced bed of oxidation catalysts while adding sufficient oxygen to substantially oxidize all said decomposition products, wherein said oxidation catalysts are deposited on a substrate impregnated with metal carbide.

8. The process according to claim 7 wherein said carrier gas further comprises being selected from the group consisting of steam, nitrogen, helium, and carbon dioxide.

9. The process according to claim 7 wherein said hazardous matter further comprises being selected from the group consisting of hydrazine and its derivatives, hydrocarbon vapors, microorganisms, and hydrocarbon-based chemicals.

10. The process according to claim 7 wherein said microwaves further comprise radiofrequency energy selected from the range consisting of 500 to 5000 Mhz.

11. The process according to claim 7 wherein said carbonaceous material further comprises being selected from the group consisting of activated carbon, char, soot, pyrolytic carbon, carbon black, activated charcoal, and metal carbides.

12. The process according to claim 7 wherein all beds further comprise being selected from the group consisting of fluidized beds, fixed beds, semi-fluidized beds, suspended beds, and moving beds.

13. A process for the environmental degradation of hydrazine and its derivatives comprising:

exposing said hydrazine and its derivatives to a bed of carbonaceous material, which is selected from the group consisting of activated carbon, char, soot, pyrolytic carbon, carbon black, activated charcoal, and metal carbides, which is contained in a microwave reactor, which is selected from the frequency range consisting of 500 to 5000 Mhz, and which produces gaseous decomposition products;

exposing said gaseous decomposition products to a bed of oxidation catalysts deposited upon a microwave absorbing substrate while adding sufficient oxygen to substantially oxidize all said decomposition products, and which is further contained in said microwave reactor; and moving said gaseous decomposition products from said bed of carbonaceous material through said bed of oxidation catalysts by a purge gas.

14. The process according to claim 13 wherein said beds further comprise being selected from the group consisting of fluidized beds, fixed beds, semi-fluidized beds, suspended beds, and moving beds.

15. The process according to claim 13 wherein said hydrazine and its derivatives are water-borne.

16. The process according to claim 13 wherein said hydrazine and its derivatives are gas-borne.

17. The process according to claim 13 wherein said purge gas further comprises a substantially inert carrier gas selected from the group consisting of nitrogen, helium, and carbon dioxide.

18. The process according to claim 13 wherein said microwave absorbing substrate further comprises impregnation with silicon carbide.

* * * * *